United States Patent
Thurau (10) Patent No.: US 7,953,503 B2
(45) Date of Patent: May 31, 2011

(54) METHOD FOR OPERATING A PROCESS PLANT, PROCESS PLANT AND COMPUTER PROGRAM PRODUCT

(75) Inventor: Oliver Thurau, Limburgerhof (DE)

(73) Assignee: Siemens Aktiengesellschaft, Munich (DE)

( * ) Notice: Subject to any disclaimer, the term of this patent is extended or adjusted under 35 U.S.C. 154(b) by 261 days.

(21) Appl. No.: 12/009,735

(22) Filed: Jan. 22, 2008

(65) Prior Publication Data
US 2008/0208373 A1 Aug. 28, 2008

(30) Foreign Application Priority Data
Jan. 23, 2007 (EP) .................................. 07001419

(51) Int. Cl.
G05B 9/02 (2006.01)
G01N 37/00 (2006.01)
G06F 11/30 (2006.01)
G08B 7/00 (2006.01)
G08B 15/00 (2006.01)
G08B 5/00 (2006.01)
A62C 35/60 (2006.01)
G06F 3/033 (2006.01)

(52) U.S. Cl. .............. 700/80; 700/79; 702/82; 702/182; 702/185; 116/4; 116/5; 116/6; 169/23; 345/158; 376/259; 340/691.6

(58) Field of Classification Search ............ 700/79, 700/80; 345/158; 376/259; 702/182, 82, 702/185; 340/691.6; 116/4–6; 169/23
See application file for complete search history.

(56) References Cited

U.S. PATENT DOCUMENTS

| | | | | | |
|---|---|---|---|---|---|
| 5,223,207 A | * | 6/1993 | Gross et al. | ................... | 376/216 |
| 5,227,121 A | * | 7/1993 | Scarola et al. | ................ | 376/216 |
| 5,260,009 A | * | 11/1993 | Penn | ............................. | 264/401 |
| 5,353,315 A | * | 10/1994 | Scarola et al. | ................ | 376/259 |
| 5,581,242 A | * | 12/1996 | Arita et al. | ................. | 340/691.6 |
| 5,631,825 A | * | 5/1997 | van Weele et al. | .............. | 700/83 |
| 5,678,568 A | * | 10/1997 | Uchikubo et al. | ............ | 128/897 |
| 6,188,388 B1 | * | 2/2001 | Arita et al. | ..................... | 345/158 |
| 6,421,405 B1 | * | 7/2002 | Ridolfo | ......................... | 376/259 |
| 6,492,901 B1 | * | 12/2002 | Ridolfo | ......................... | 340/506 |
| 2005/0284491 A1 | * | 12/2005 | Tashiro et al. | ................ | 128/897 |

FOREIGN PATENT DOCUMENTS
WO WO 2006000110 A1 1/2006

OTHER PUBLICATIONS

Tsai et al., "Robust Alarm Generation Strategy", 2000, Elsevier, 2000, pp. 743-748.*

* cited by examiner

Primary Examiner — Albert Decady
Assistant Examiner — Thomas Stevens

(57) ABSTRACT

A method for operating a process plant, in which a number of alarm notifications for indicating non-compliant operating events of the process plant are generated at process level. Alarm notifications which can be generated during the operation of the process plant are defined. At least a number of the generatable alarm notifications are assigned, in each case at least a first value or a second value as a dependency value. A current process state of the process plant is determined and depending on the determined process state, those alarm notifications to which the first value was assigned as a dependency value are not indicated.

19 Claims, 4 Drawing Sheets

METHOD FOR OPERATING A PROCESS PLANT, PROCESS PLANT AND COMPUTER PROGRAM PRODUCT

CROSS REFERENCE TO RELATED APPLICATIONS

This application claims priority of European Patent Office application No. 07001419.6 EP filed Jan. 23, 2007, which is incorporated by reference herein in its entirety.

FIELD OF INVENTION

The present invention relates to a method as per the preamble of the patent claim 1 for operating a process plant, wherein a number of alarm notifications are generated at process level for indicating non-compliant operating events of the process plant.

The present invention further relates to a process plant comprising a number of alarm emitters at process level which are designed to generate a number of alarm notifications for indicating non-compliant operating events of the process plant, and comprising an alarm indication entity for indicating alarm notifications.

The present invention further relates to a computer program product for operating a process plant.

BACKGROUND OF INVENTION

In the control technology of process plants, e.g. in the chemical industry, pharmaceutical industry or the oil/gas industry, automation systems are routinely used which generate a large number of alarm notifications and forward them to a plant operator in the case of non-compliant operating events of the process plant, such as pressure drops, temperature increases or the like. In specific situations, e.g. if a process plant is shut down or specific key components of the process plant are selected, this can cause a flood of system-generated alarms which can no longer be controlled or managed by the operator, thereby possibly resulting in serious accidents.

It is also apparent that the alarm notifications which are generated in a process plant have specific interdependencies. For example, specific non-compliant operating events directly result in the generation of a first alarm, whose occurrence is then inevitably linked to a flood of so-called secondary alarms (report flood). Such secondary alarms do not give the operator any real additional information content but can no longer be controlled in some circumstances, thereby resulting in undesired plant shutdowns and even in serious accidents in the worst case.

A concrete example of the occurrence of such secondary alarms relates to a failure of the network card in an automation device which is part of a process plant. In this context, an alarm indicating the failure of the network connection for the automation device is generated immediately. Since the automation device cannot subsequently transmit any data, e.g. temperature data or pressure data, to the rest of the process plant as a result of the cessation of its network connection, a whole series of secondary alarms is then (subsequently) generated which indicate that the cited data is missing or invalid. However, as mentioned above, such secondary alarms do not provide any additional information for the operator, in particular since they disappear together with their cause when the original source of the error, i.e. the faulty network connection in the present case, is cleared.

International associations such as e.g. NAMUR or EEMUA are therefore calling for solutions, in the control technology of process plants, which are capable of activating or deactivating specific alarms depending on the plant state and the combination of outstanding alarms (so-called dynamic alarm processing). This is intended to bring about a reduction in the overall quantity of alarms and therefore allow plant dependability to be re-established generally.

In connection with this, the prior art discloses the initial filtering of alarms directly at the alarm source, i.e. at process level, by incorporating a corresponding logic. In the case of such a solution, it is considered disadvantageous in particular that error traceability is no longer provided. Alarms which are filtered at the source cannot be archived and are therefore not available for subsequent analyses or statistical evaluations at process control level.

In addition, so-called alarm management systems are disclosed in the form of designated independent systems for the alarm handling of process plants. Since these work in a standalone manner and independently of the control system of the process plant, they demand corresponding additional attention from the plant operator. Furthermore, such independent systems do not offer the convenience of a solution which is integrated into the plant operation and are moreover unable automatically to allow for changes in the plant control technology, since separate data storage and separate engineering are involved in particular.

SUMMARY OF INVENTION

A concurrent patent application of the applicant discloses a method and an apparatus for automatically masking process alarms, wherein consideration is given to a configurable set of alarms which are still processed by the alarm processing system of a process plant depending on defined plant states, but are not indicated to the plant operator. In this case, during the planning of a process plant, a specific set of alarms for a specific plant state or part-plant state is classified as not relevant. If such a non-relevant alarm occurs during the process management, the alarm processing system masks this alarm for the operator, i.e. the corresponding alarm notifications are not indicated (optically and/or acoustically).

Even given such an inherently advantageous solution, the situation can nonetheless arise in the case of a report flood that the number of alarms which are defined as relevant for a current plant state is still too high and expands into a demand that can only be managed with difficulty by the operator.

The invention addresses the problem of specifying a process plant and a method for the operation thereof, in which it is possible in a simple manner to reduce the alarms that are indicated from the overall quantity of alarms depending on already outstanding alarm notifications of the plant, wherein provision is made for full traceability of alarm notifications. Furthermore, simple operability of the process plant is nonetheless provided.

The problem is solved, using a method of the type cited in the introduction, by the characterizing features in an independent patent claim.

A method for operating a process plant, in which a number of alarm notifications for indicating non-compliant operating events of the process plant are generated at process level is provided.

Alarm notifications which are generated during the operation of the process plant are defined, wherein
at least a number of the generated notifications are assigned in each case at least a first value or a second value as a dependency value.

A current process state of the process plant is determined, and depending on the determined process state, those alarm notifications to which the first value has been assigned as a dependency value, are not indicated.

The problem is also solved, using a process plant of the type cited in the introduction, by the characterizing features of a further independent patent claim.

A process plant comprising a number of alarm emitters at process level, these being designed to generate a number of alarm notifications for indicating non-compliant operating events of the process plant, and comprising an alarm indication entity for indicating alarm notifications, is provided.

An alarm processing system is provided at process control level and receives the generated alarm notifications, wherein at least a number of alarm notifications are assigned at least a first value or a second value in each case as a dependency value, and wherein the alarm processing system is designed to control the alarm indication entity depending on the dependency value such that those alarm notifications which were assigned the first value as a dependency value are masked.

The problem is also solved by means of a computer program product for operating a process plant, featuring program code sequences which are designed, when executed in a process control system of the process plant and depending on determined process state data of the process plant, to process alarm notifications, these being generated at process level, in accordance with a method according to the invention.

Advantageous embodiments of the present invention are the subject matter of subclaims whose wording is hereby included in the description by virtue of reference thereto.

As a result of the inventive dependency value which is or can be assigned to each generatable alarm notification, during the planning of a process plant it is possible to determine whether a specific alarm or corresponding generated alarm notification should be treated as a secondary alarm or not. In this case, as mentioned above, a secondary alarm is a type of alarm which routinely occurs depending on at least one other alarm. Secondary alarms can therefore also be considered as dependent alarms which are dependent on at least one corresponding independent alarm or occur at least routinely subsequent to such an independent alarm. Therefore if a corresponding independent alarm is outstanding, i.e. corresponding alarm notifications were generated, it is not necessary to indicate secondary alarms, i.e. those alarms which were assigned the first value (=dependent) as a dependency value, since the corresponding error states are also routinely cleared when the at least one independent alarm ceases, i.e. when the error source is correspondingly cleared.

The proposed approach to the solution integrates alarm suppression mechanisms, which are based on interdependencies of generated alarm notifications, with the ability in the context of specific embodiments to dynamically, i.e. with reference to determined process states, determine the relevance of alarm notifications in the form of process alarms and in this way to mask non-relevant process alarms, i.e. to not indicate them.

The latter feature is itself subject matter of a concurrent European patent application of the applicant, which has the official application number 06009891.0 and to which reference is explicitly made in this respect. In addition to the totality of all generatable process alarms or alarm notifications, the alarm processing system of the process plant also captures current process statuses in order to correlate these with the process alarms in this case. In addition to the process alarms or alarm notifications which are generated at process level, process states of an automation process, or of individual sub-processes if there is functional distribution of the automation process, are therefore also sent to the alarm processing system accordingly.

On the basis of the pair-based correlation between a process state and an alarm notification in each case, in conjunction with a correlation value which is assigned in each case, the alarm processing system then decides which process alarms should be indicated in which process states and which should not. In the case of alarms which are to be indicated in principle, the invention then provides for a check to determine whether their dependency value characterizes them as "dependent", i.e. as secondary alarms. In this way, non-relevant alarms and secondary alarms can be masked in alarm indicators for the operator. Alternatively or additionally, masked alarm notifications (non-relevant alarms and/or secondary alarms) are ignored by acoustic and/or optical signal emitters.

Since there is no suppression of alarm notifications at the alarm source, but merely a selective masking of alarms in the alarm processing system, in particular all masked alarm notifications can also be archived for tracking purposes in an alarm-journal, thereby allowing subsequent reconstruction by the operator. According to the invention, therefore, the entire functionality of the alarm suppression mechanism which is outlined above can be fully integrated into an existing process control system.

An embodiment of the method according to the invention provides for the dependency values to be arranged in the form of at least one secondary-alarm matrix, wherein a dimension of the secondary-alarm matrix is formed by the generatable alarm notifications. In a development of the method according to the invention, provision is additionally made for the correlation between process states and alarm notifications likewise to take the form of at least one configuration matrix, wherein a first dimension of the configuration matrix is formed by the defined process states and a second dimension of the configuration matrix is formed by the generatable alarm notifications, wherein the correlation values represent the entries in the configuration matrix.

Corresponding developments of the inventive process plant firstly provide for the alarm processing system to feature at least one secondary-alarm matrix for the alarm notifications, wherein a dimension of the secondary-alarm matrix is formed by the generatable alarm notifications, wherein the dependency values represent the entries in the secondary-alarm matrix. Provision can secondly be made for the alarm processing system to feature at least one configuration matrix for correlating the process states and the alarm notifications, wherein a first dimension of the configuration matrix is formed by the defined process states and a second dimension of the configuration matrix is formed by the generatable alarm notifications, wherein the correlation values represent the entries in the configuration matrix.

In accordance with the invention, it is thus possible to plan the alarm relevance in a particularly simple manner without system and/or programming knowledge by making entries in the secondary-alarm matrix and/or in the configuration matrix, thereby preventing an occurrence of report floods in particular.

The secondary-alarm matrix can be part of the configuration matrix; in particular, it can be designed as a column of the configuration matrix, which can therefore also be designated as a secondary-alarm/configuration matrix in this case. However, it is also possible to provide an individual secondary-alarm matrix for each process state contained in the configuration matrix.

For safety reasons, it is theoretically desirable for all generated alarm notifications to be indicated unless circumstances dictate otherwise, e.g. in the case of a plant shutdown it is desirable to mask an alarm notification which indicates the expected pressure drop. In the case of a particular embodiment of the invention, provision is therefore made for the second value (=no masking) to be assigned by default as a dependency value or as a correlation value.

In order to ensure traceability of operating states of the process plant, a further development of the invention provides for at least those alarm notifications which were assigned the first value as a dependency value or as a correlation value to be archived in a storage entity, depending on the specific process state. All generated alarm notifications are preferably archived in the storage entity, however, irrespective of their current relevance or dependency.

In order that the invention can be fully integrated into existing process plants, a development of the invention makes particular provision, in the case of embodiments of the method according to the invention, for the process state in step c) to be determined at process level and transmitted, together with the totality of the generated alarm notifications, to a process control level of the process plant, and for the steps b) and d) to be carried out in an alarm processing system at the process control level.

When the process plant changes over to a new state, embodiments of the inventive method preferably provide for step d) to be executed again at the time of the change, wherein outstanding alarm notifications that have already been generated are indicated depending on the new process state.

In this way, fully dynamic alarm suppression is possible.

In a development of the method according to the invention, if the process state is incorrectly determined in step c), provision is additionally made for all further generated alarm notifications to also be indicated in the subsequent step d).

In order to achieve greater plant safety, this ensures that no generated alarm notifications are lost if the inventive alarm suppression works incorrectly.

Alternatively, if the process state is incorrectly determined in step c), provision can be made for the further generated alarm notifications only to be indicated in the subsequent step d) depending on the associated dependency value.

If an automation process which is carried out by the plant according to the invention is divided into a plurality of sub-processes, a development of the invention provides for each sub-process to be assigned a number of sub-process states and a number of generatable alarm notifications in the form of an alarm group, and for the steps b) to d) of embodiments of the method according to the invention to be executed separately for each sub-process.

As part of corresponding developments of the method according to the invention, outstanding secondary alarms are masked in accordance with the corresponding dependency value until at least one independent alarm, i.e. an alarm which is not classified as a secondary alarm, is outstanding and is indicated accordingly. As explained above, when an independent alarm ceases, subject to correct classification it can be assumed that all secondary alarms also cease, at least to the extent that they relate to the corresponding independent alarm. As a rule, therefore, when an independent alarm ceases, the corresponding secondary alarms are also "resolved". In relation to this, however, a development of the method according to the invention can provide for all remaining outstanding secondary alarms to be indicated immediately upon cessation of an independent alarm, in particular the last independent alarm. Alternatively, provision can be made for indicating remaining outstanding secondary alarms in the sequence of their (chronological) occurrence, such that a secondary alarm which occurred first is also indicated first. Further remaining outstanding secondary alarms are then indicated in the sequence of their occurrence.

According to another development of the method according to the invention, provision can also be made for the generatable alarm notifications to be allocated a further value in the form of a priority value in addition to the dependency value. The priority value can specify the sequence in which remaining outstanding secondary alarms are to be indicated, irrespective of their chronological sequence. As a rule, however, a corresponding default prioritization is already prescribed during the definition of a specific alarm, and therefore need not be defined again in the context of the alarm masking method which is described here.

While the distinction between the first and second values for the dependency and/or correlation values preferably takes place in a binary manner (0/1; entry/no entry) in a development if the present invention, provision can also be made, in particular for realizing the aforementioned prioritization, for the dependency values to be configured as multibit values so that they can contain further information such as the aforementioned priority level in particular.

As part of a special embodiment of the invention, the runtime characteristics of a process plant according to the invention or the routine of the method according to the invention can therefore be summarized as follows: for as long as at least one alarm relative to an alarm group, i.e. a sub-process, is outstanding in the alarm processing system, further alarms which are marked as secondary alarms by virtue of their dependency values are masked at the alarm indicators for an operator or are ignored by further emitters of optical or acoustic signals. In order to allow the tracking of process flows, the secondary alarms are nonetheless also archived in an alarm journal for the operator.

In this case, in the context of corresponding embodiments of the present invention, the alarm processing system applies the "secondary alarm" label exclusively in the case of those plant states in which the corresponding alarm is relevant, i.e. was not explicitly marked as irrelevant during the planning of the process plant. This consequently results in a sequential masking of alarms, wherein those alarms which are generally not relevant in a specific process state are advantageously masked first, and then a check takes place in order to establish whether the alarms that remain as relevant are secondary alarms, in which case they are masked accordingly in a second step.

Even in the case of a report flood, i.e. large-scale and virtually simultaneous occurrence of a multiplicity of alarms, those alarms that are not identified as secondary alarms are indicated to the operator in the usual manner (e.g. in list form) or result in corresponding optical/acoustic signals if the corresponding signal for the preceding alarm (in the list) was already acknowledged.

If the status of a masked (i.e. correspondingly marked with the first dependency value) secondary alarm changes from "come" to "gone", the alarm is acknowledged by the alarm processing system itself, i.e. confirmed as outstanding. Masked secondary alarms for which no "gone" status is defined are immediately acknowledged by the alarm processing system when the "come" status occurs.

As mentioned above, when all visible alarms of an alarm group have been acknowledged by the operator and are no longer outstanding, an embodiment of the method according to the invention provides for a hidden (i.e. masked) and still outstanding secondary alarm to be made visible by the alarm processing system. If a plurality of hidden secondary alarms are outstanding, an embodiment of the method according to the invention provides for that secondary alarm which has the oldest "come" status according to a time stamp to be made visible first.

In a development of the present invention, alarms which are currently masked due to their secondary alarm label, i.e. their dependency value, are advantageously displayed in a separate list together with the currently outstanding non-relevant alarms.

As part of an embodiment of the method according to the invention, changes to the planning of the secondary alarms, i.e. changed entries in respect of the relevant dependency values, can be transferred by the alarm processing system at runtime.

The following approach can be used advantageously for an automated planning of secondary alarms, wherein the configuration of secondary alarms can be system-managed in principle: in order to achieve this, report floods occasioned by abnormal situations are captured and evaluated by the system during the commissioning/testing phase of a process plant. If necessary, the system can be configured to trigger the generation of such report floods itself. On the basis of the aforementioned evaluation, the system then proposes a list of secondary alarms for an alarm group, which the person commissioning the process plant can confirm and adapt if necessary.

The determining of secondary alarms in relation to specific report floods can also be done during the plant operation by evaluating the alarm journal. For this purpose, as part of an embodiment of the method according to the invention, provision is made for a corresponding analysis tool which, after evaluation of the alarm signal, generates a list of recognized secondary alarms for an alarm group, e.g. by examining which alarms routinely occur following the occurrence of specific other alarms. An operator acting as a plant optimizer can then confirm and optionally adapt the proposal.

The present invention advantageously contributes to the reduction of engineering costs by allowing the planning of process plants without programming knowledge, i.e. the specification of secondary alarms by means of simple value allocation, in particular by means of markings in a table. Furthermore, the proposed integration of the configuration step into an existing control system at process control level allows the utilization of existing system knowledge. A list of the configured secondary alarms can be indicated easily on the basis of a corresponding filter parameterization. The present invention therefore also contributes to an increase in the plant safety by virtue of reducing operator loading as a result of limiting alarms to one or few alarms per actual event. Automated routines are not affected in this case, but information is merely adapted to the operator interface. The further reduction in the operator loading also contributes to a decrease in the operating costs.

BRIEF DESCRIPTION OF THE DRAWINGS

Further attributes and advantages of the present invention are derived from the following description of exemplary embodiments with reference to the drawing, in which.

DETAILED DESCRIPTION OF INVENTION

Figure 1:
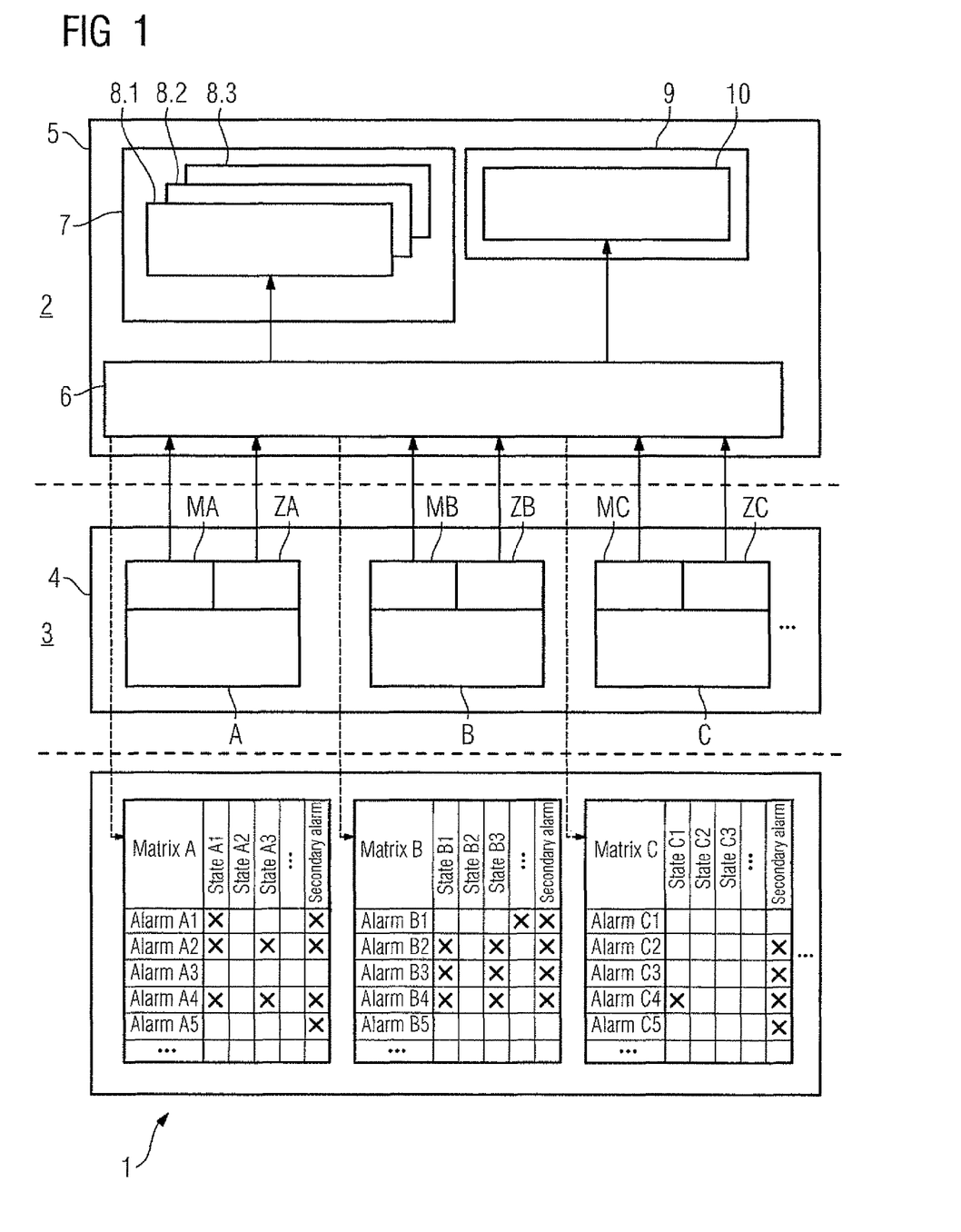
FIG. 1 shows a schematic block diagram of a process plant according to the invention.

FIG. 1 shows a process plant 1, e.g. for carrying out chemical or pharmaceutical processes or for processes in the oil/gas industry, the wood processing industry, the paper industry or similar. Such a plant normally features a process control level 2 and a process level 3, wherein the actual automation processes which are characteristic of the type and use of the process plant are established in the latter. Such an automation process is illustrated by way of example in FIG. 1 and is given reference sign 4.

At process control level 2, the process plant 1 according to the invention has an alarm system 5, which firstly features an alarm processing system 6 that is preferably developed as software in a data processing entity which is not illustrated explicitly. The alarm processing system 6 has an active connection to an alarm indication entity 7, which itself features a number of alarm indicators/alarm signal emitters 8.1 to 8.3, wherein these can be e.g. visual/optical alarm indicators such as lights or screen windows, or acoustic alarm indicators such as klaxons or sirens. In addition, the alarm processing system 6 has an active connection to a storage entity 9 which is designed here for storing an archive file 10 in the form of a so-called alarm journal.

At process level 3, the process plant 1 according to the invention has a series of sub-processes A, B, C as components of the automation process 4, and these can be identified in each case by means of specific sub-processes or part-processes of the automation process 4. Each of the three processes A to C comprises a series of process-related work operations (not explicitly illustrated) which, in the case of a process plant of the type shown in FIG. 1, are routinely assigned monitoring entities in the form of pressure sensors, temperature sensors or similar, that monitor process states of the respective sub-process. Furthermore, such monitoring entities are routinely assigned a number of alarm emitters at process level, these being designed to generate a number of alarm notifications for indicating non-compliant operating events of the process plant or of the respective (sub-)process, e.g. if a measured pressure drops significantly.

In terms of alarms, each of the sub-processes A to C illustrated in FIG. 1, or the alarm emitters provided in the context of the sub-process concerned, can therefore also be designated as an alarm group, whose actual embodiment in the present invention is described in detail below with reference to FIG. 2.

Each of the sub-processes A to C or the corresponding alarm group interacts with a reporting component or reporting module MA to MC and with a state component or state module ZA to ZC. For their part, the reporting components MA to MC and the state components ZA to ZC in each case have an active signaling connection to the alarm processing system 6 of the alarm system 5.

As illustrated in the lower part of FIG. 1 for the sake of clarity, the alarm processing system 6 contains a number of secondary-alarm/configuration matrices Matrix A, Matrix B, Matrix C. Each of the matrices is assigned to one of the sub-processes A to C or to the corresponding alarm group. A first dimension (columns) of the secondary-alarm/configuration matrices Matrix A, Matrix B, Matrix C is formed by predefined process states of the corresponding sub-process A to C. In FIG. 1, these process states are designated as State Ai, State Bi, State Ci, where i=1, 2, ..., N. In this case, N designates a maximal number of possible states per sub-process, where N can vary from sub-process to sub-process. The second dimension (rows) of the secondary-alarm/configuration matrices Matrix A, Matrix B, Matrix C is formed by the relevant totality of the alarm notifications that can be generated for the corresponding sub-process A to C. In this case, each of the alarm notifications designated as Alarm Ai, Alarm Bi, Alarm Ci in FIG. 1 corresponds to the alarm signal of an alarm emitter from the alarm group which is assigned in each case to the corresponding sub-process. In this case, each of the illustrated alarms is provided for indicating a non-compliant operating event of the process plant or of a sub-process which runs on said process plant.

The last column of the matrices A, B, C in each case is designated "secondary alarm"; its entries define whether an alarm Ai, Bi, Ci is classified as a secondary alarm (cross) or not.

As further entries, the secondary-alarm/configuration matrices Matrix A, Matrix B, Matrix C contain correlation values for correlating each process state State Ai, State Bi, State Ci with the corresponding totality of the alarm notifications Alarm Ai, Alarm Bi, Alarm Ci that can be generated for the respective sub-processes A to C. The correlation values are shown in FIG. 1 in the form of crosses "X" or empty (white) fields in the corresponding matrices. In this case, each matrix entry relates to a pair which is formed from a process state and an alarm notification. Each of these pairs is assigned a first value ("X") or a second value (white field) as a correlation value accordingly.

In addition—as mentioned above—the final column of the relevant matrix specifies whether a specific alarm is a secondary alarm or not. In this case, each alarm is assigned a first value ("X") or, as a default setting, a second value (empty field) as a dependency value.

According to the invention, the matrices Matrix A, Matrix B, Matrix C are used, depending on a specified/determined process state of the process plant 1 or of a corresponding sub-process A to C, to prevent the indication of (i.e. to mask) those alarm notifications Alarm Ai, Alarm Bi, Alarm Ci, generated in the context of this sub-process, which were assigned the first value ("X") as a correlation value and/or as a dependency value. In other words: the "X" entries in the first columns of the matrices Matrix A, Matrix B, Matrix C in FIG. 1 represent a configuration of non-relevant process alarms depending on a process state, and serve the alarm processing system 6 as a kind of initial mask for masking alarm notifications which are consequently not indicated by means of the alarm indication entity 7. The final column of the matrices A, B, C also serves as a kind of second mask for the further masking of secondary alarms, in order to prevent report floods.

The operation of the process plant 1 according to the invention is explained again in summary below:

For the operation of the process plant 1, i.e. for the purpose of describing the operating events that take place in the sub-processes A to C, a series of states State Ai, State Bi, State Ci (e.g. startup, normal operation, emergency cutoff, shutdown or similar) are defined in the context of the present exemplary embodiment and without restricting the general applicability. In addition, each sub-process A to C or the associated alarm group includes a series of alarm emitters which generate corresponding alarm notifications or alarm signals Alarm Ai, Alarm Bi, Alarm Ci in the event that non-compliant operating events occur within the relevant sub-process. By means of the secondary-alarm/configuration matrices Matrix A, Matrix B, Matrix C, it is first established which process alarms are not relevant in which state of a respective sub-process and therefore, although they are generated at process level 3, need not be indicated at process control level 2 by e.g. activating a siren or displaying a warning notice on a screen, which would be possible using the alarm indication entity 7. At the same time, the entries in the final matrix column in each case define which alarms of a sub-process count as secondary alarms and therefore—if at least one non-secondary alarm is outstanding—are not indicated even if they are classified as relevant.

In other words: by virtue of the alarm group of the relevant sub-process A to C, if non-compliant operating events occur, corresponding alarm notifications are generated and transferred to the alarm processing system 6 via the allocated reporting component MA, MB, MC. At the same time, the state components ZA, ZB, ZC which are assigned in each case to the sub-processes A to C (routinely/continuously) determine the current process state of the sub-process and transfer this also to the alarm processing system 6. Consequently, the alarm processing system is aware at all times of the process state of a specific sub-process. With reference to the associated secondary-alarm/configuration matrix Matrix A, Matrix B, Matrix C and depending on the respective process state of the sub-process, it is therefore possible to determine which of the (outstanding) process alarms Ai, Bi, Ci are relevant in the current state of the sub-process (white field in the matrix) and which are not ("X"). A check then establishes whether a relevant alarm is possibly "merely" a secondary alarm, which is not indicated accordingly.

In this way, the so-called alarm hiding (masking of outstanding alarm notifications) is done exclusively at process control level by the alarm processing system 6, at which all alarm notifications generated by the alarm groups continue to arrive. The alarm processing system 6 then decides, with reference to the secondary-alarm/configuration matrices, which alarm notifications should be indicated via the alarm indication entity 7 and which should not.

In the case of the embodiment of the inventive process plant 1 which is shown in FIG. 1, irrespective of any indication of alarm notifications by means of the alarm indication entity 7, the alarm processing system 6 transmits all generated alarm notifications, i.e. all relevant and all non-relevant process alarms and hence also all secondary alarms, to the storage entity 9 or the alarm journal 10 which is maintained therein, such that a (retrospective) inspection of the plant state is possible at any time irrespective of the indication of the alarm notifications.

In this way, according to the invention, the planning of the relevance and the secondary-alarm attribute of an alarm by an operator of the inventive process plant with reference to the process states takes place in a simple and clear manner via a matrix and, in particular, does not require any system knowledge or programming knowledge. It is sufficient if the planning engineer who configured the plant in respect of the automation function has process knowledge. As a result of the illustrated grouping of all alarm-emitting functions of a sub-process into an alarm group, it is also possible to provide plant-wide alarm processing which—as shown in FIG. 1—involves an advantageous central data storage and persistency even in the case of distributed systems.

Figure 2:
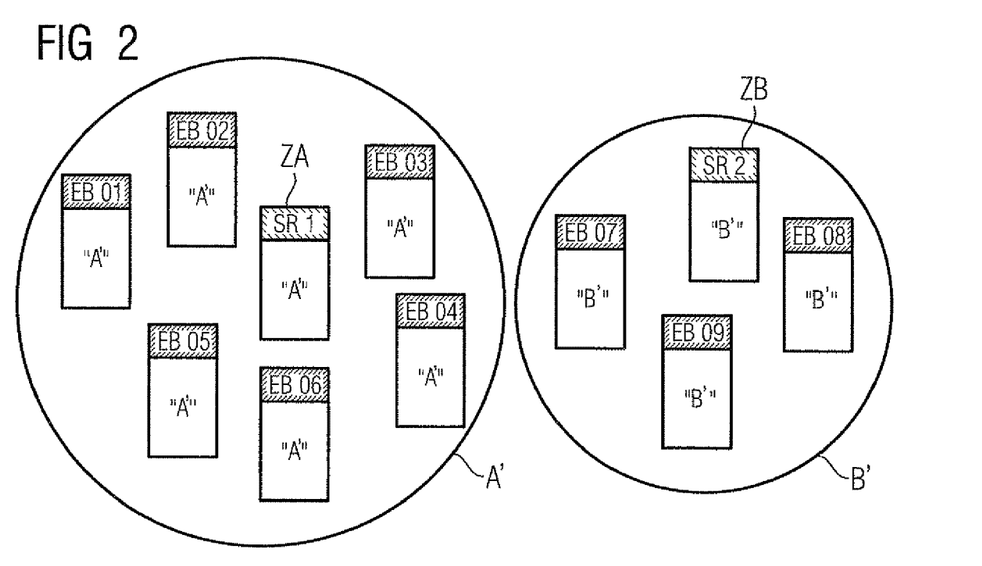
FIG. 2 shows a schematic illustration of a formation of alarm groups in inventive process plant as per FIG. 1.

On the basis of a schematic illustration, FIG. 2 shows the copying of all alarm-emitting functions (also designated as alarm emitters here) of a sub-process (cf. sub-processes A to C in FIG. 1) to an alarm group which is assigned to one of the sub-processes in each case. The individual alarm groups are illustrated in FIG. 2 by means of circular delimitation lines and have reference signs A', B' which are similar to those of the corresponding sub-processes in FIG. 1. Each alarm group A', B' comprises a number of alarm emitters EB01 to EB06 or EB07 to EB09, which are identified in each case as belonging to a corresponding alarm group A', B' "A"' or "B"'. As illustrated above, the alarm emitters EB01 to EB09 generate alarm notifications for indicating non-compliant operating events of the process plant or of the sub-process which is assigned to the relevant alarm group, which are transferred to the alarm processing system 6 by the associated reporting component MA to MC (FIG. 1).

In addition, each alarm group A', B' in FIG. 2 also features a state component SR1 or SR2, which is likewise identified as belonging to the relevant alarm group A', B' "A"' or "B"'. As illustrated likewise with reference to FIG. 1, the state components SR1, SR2 corresponding to the state components ZA to ZC illustrated therein are used for specifying a (current) state of the respective sub-process of the process plant, and transfer this in normalized form to the alarm processing system 6 (FIG. 1). The state components ZA to ZC or SR1, SR2 can therefore be designated as state normalization components.

As explained in detail above, in accordance with the invention these states are used to decide, on the basis of the secondary-alarm/configuration matrices Matrix A, Matrix B, Matrix C (FIG. 1), which generated alarm notifications should be indicated and which should not, depending on the determined process state and their secondary-alarm attributes.

Figure 3:
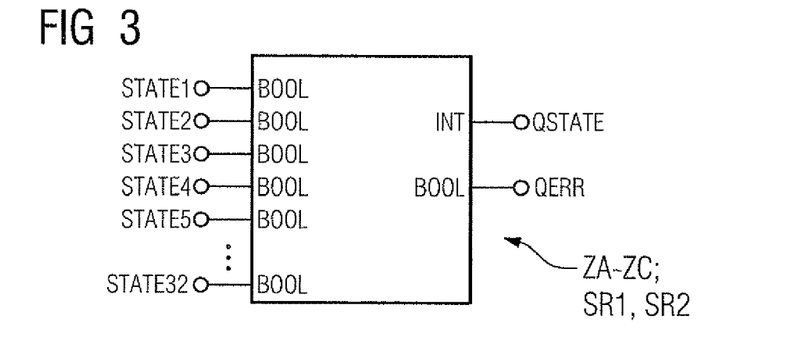
FIG. 3 shows a state module of the process plant as per FIG. 1 with reference to a detailed illustration.

FIG. 3 schematically shows one of the state components ZA to ZC or SR1, SR2 which is assigned to a sub-process from the FIG. 1 or 2. Information relating to the process state of a sub-process is provided to the state component in the form of Boolean input parameters which are designated STATE_XX in FIG. 3. As part of the illustrated exemplary embodiment, up to 32 input parameters can be predetermined in this way. The STATE_XX input parameters define (encode) a specific process state which is communicated to the state component via the control logic of an application program (not shown) for controlling the automation process 4 at process level 3 (FIG. 1). In the case of the exemplary embodiment of the present invention shown here, up to thirty-two different process states of the process plant or of the executed sub-processes A to C (FIG. 1) can be defined in this way. The state component as per FIG. 3 converts the state which has been defined (encoded) thus into an integer value QSTATE in a value range from zero to thirty two, and transfers this to the alarm processing system 6, as shown in FIG. 1, in the form of a state signal which represents the respective process state.

In the case of the exemplary embodiment shown in FIG. 3, if none of the linear input signals STATE_XX has a high logic level (1) hat, the value zero is generated for the state signal QSTATE and an error signal having a low logic level (0) is output at a further output QERR of the state component, indicating error-free operation of the state component (not of the process plant). In the event that more than one of the binary input signals STATE_XX has a high logic level (1), the value zero is again output as state signal QSTATE and an error signal having a high logic level (1) is generated at the output QERR.

The error signal QERR is likewise transferred to the alarm processing system 6 in FIG. 1, although this is not explicitly illustrated there. It is used for a supervisory control of the alarm-hiding mechanism according to the invention, wherein the secondary-alarm/configuration matrices Matrix A, Matrix B, Matrix C which were explained in detail with reference to FIG. 1 are only used for masking, i.e. not indicating, alarm notifications if QERR=0, i.e. if no error is signaled by a relevant state component ZA to ZC; SR1, SR2. In the opposite case, the corresponding assigned secondary-alarm/configuration matrix Matrix A, Matrix B, Matrix C is not used, but all outstanding generated alarm notifications for the sub-process concerned are indicated and archived at the same time for the sake of safety.

It is optionally possible to distinguish between alarm relevance and secondary-alarm attribute in this context. In other words, if QERR< >O all generated alarm notifications are indicated if they are not secondary alarms.

Figure 4:
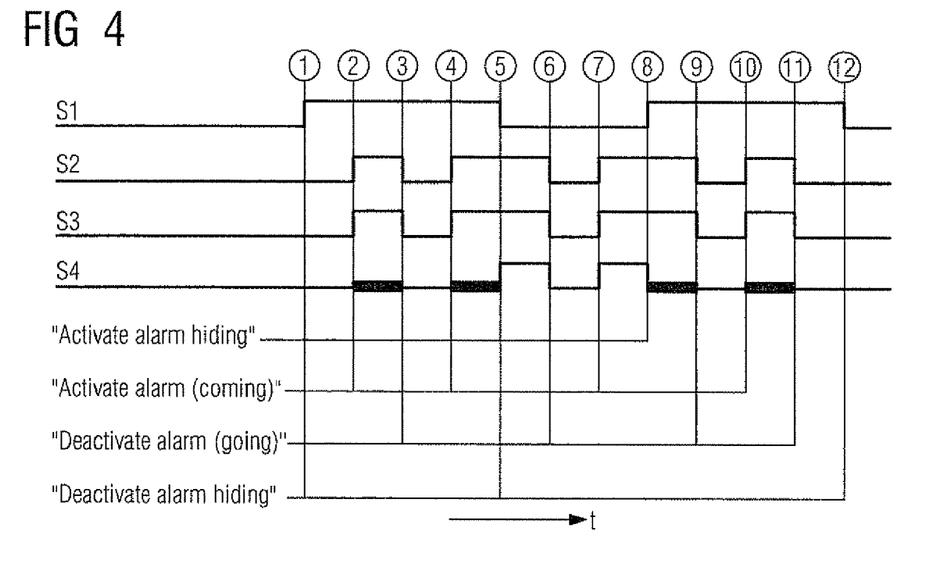
FIG. 4 shows a chronological diagram of the alarm response of a process plant which is operated in accordance with a method according to the invention.

FIG. 4 shows the response of a process plant according to the invention during operation (runtime response) with reference to a chronological diagram. This shows a number of signal profiles S1 to S4 depending on the time t. In this case, specific time points of the chronological sequence are additionally designated by means of numbers for the sake of simpler identification and are subsequently designated according to this numbering as t1, t2, . . . . Furthermore, specific control instructions for operating the process plant 1 or the available alarm system 5 (FIG. 1) are given in quotation marks and assigned via dotted connection lines to specific time points or signal transmissions of the signals S1 to S4. The signals S1 to S4 are binary signals which can be switched between a high logic level (1) and a low logic level (0).

The control instruction "Activate alarm hiding" as specified in FIG. 4 is generated depending on the secondary-alarm/configuration matrices Matrix A, Matrix B, Matrix C (FIG. 1), which are used for masking general notifications depending on process states of the process plant. It causes the corresponding signal S1 to switch from a low logic level to a high logic level at the time points t1 and t8. For as long as the signal S1 is not switched back to the low logic level ("deactivate alarm hiding"; time points t5, t12) the alarm-hiding mechanism proposed in the context of the present invention is active. This can be seen in FIG. 4 with reference to the signal profiles S2 to S4 relating to the existence of alarm notifications in different areas of the process plant.

The signal profile S2 shows the presence or the generation of at least one alarm or one alarm notification at process level 3 (FIG. 1), perhaps as a result of the alarm group A' which belongs to sub-process A (FIG. 2). According to FIG. 4, this alarm is generated between the time points t2 and t3, t4 and t6, t7 and t9, and t10 and t11. Signal profile S3 indicates the presence of this alarm in the alarm processing system 6 (FIG. 1). Since no masking and suppression of alarm notifications takes place at process level 3 according to the invention, the signal profile S3 corresponds exactly to the previously described signal profile S2, since each alarm which is generated at process level also arrives at the process control level 2, i.e. at the alarm processing system 6, in the form of a corresponding alarm notification.

The signal profile S4 indicates how the alarm processing system 6 (FIG. 1) deals with the outstanding alarm notifications using a corresponding secondary-alarm/configuration matrix. Specifically, signal profile S4 specifies whether the alarm notification according to signal profile S2, S3 is indicated in the alarm indication entity 7 (FIG. 1), this being symbolized by a high logic level (1). Assuming that, in the secondary-alarm/configuration matrix to be used, a corresponding (first) correlation value ("X" in FIG. 1) is entered for the relevant alarm depending on a current process state, or the corresponding alarm is marked as a (dependent) secondary alarm by virtue of an entry in the final matrix column ("secondary alarm"), the outstanding alarm according to signal profile S4 is suppressed in the context of indication, this being symbolized in FIG. 4 by thicker horizontal bars, and is only indicated in the time from t5 to t8 because the alarm-hiding mechanism proposed in the context of the present invention is deactivated during this time (S1=0).

The control instructions "activate alarm (coming)" and "deactivate alarm (going)" which are additionally specified in FIG. 4 correlate with time points at which the relevant alarm is activated due to a non-compliant operating event or is deactivated again when a compliant operating event is re-established.

In this way, the alarm system 5 (FIG. 1) is able to recognize when the process plant or a part-plant/sub-process changes its state, such that outstanding alarms are masked if they are no longer relevant or are classified as secondary alarms in the new plant state according to the secondary-alarm/configuration matrices. Conversely, masked alarms which become relevant in the new plant state are included again if they are not defined as secondary alarms.

Furthermore, the alarm system 5 (FIG. 1) advantageously allows an operator to display a list of all masked alarms. Alternatively or additionally, it is possible to display a list of those alarms which would have to be masked if they were generated by the (sub-)process at the time point concerned.

In the context of the present invention, provision can additionally be made for a timer function in the alarm system 5 (FIG. 1), such that in the event of switching to a new plant state, specific alarms which are no longer relevant in this state but were relevant in a preceding state are still tracked, i.e. indicated, over a specific time period, wherein the inventive masking of such alarms only takes place after expiry of a timer which is present in the timer function.

Figure 5:
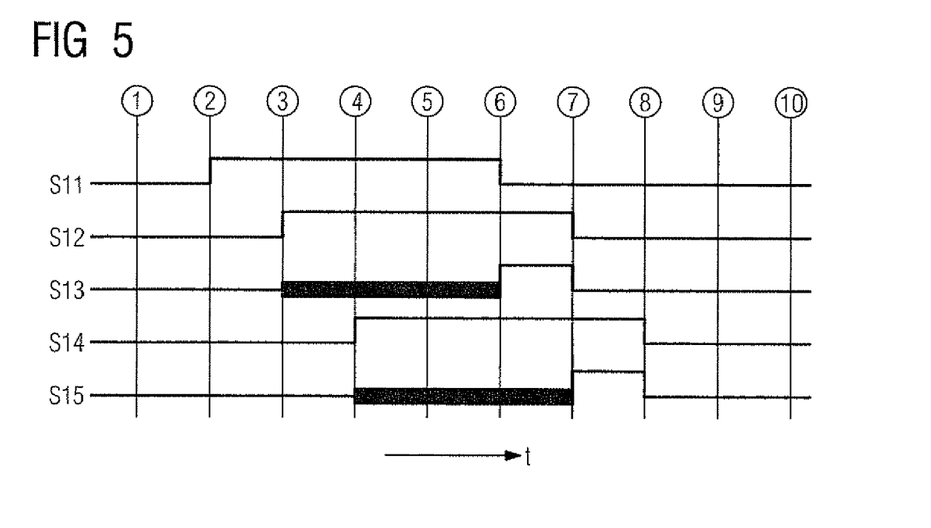
FIG. 5 shows a further chronological diagram of the alarm response of a process plant which is operated in accordance with a method according to the invention and FIG. 6 shows a flow diagram of an embodiment of the method according to the invention.

With reference to a further chronological diagram, FIG. 5 shows the runtime response during operation of a process plant according to the invention. A number of signal profiles S11 to S15 depending on the time t are illustrated. In this case as in FIG. 4, for ease of identification, specific time points of the chronological sequence are again designated by means of numbers and are referenced accordingly below. The illustration type in FIG. 5 also corresponds to that of FIG. 4 in other respects generally.

The signal profile S11 illustrates the generation of a first alarm at time point t2, wherein said alarm lasts (is outstanding) until time point t6. It is an independent alarm in this case, i.e. an alarm which is not identified as a secondary alarm in the secondary-alarm/configuration matrices. It can therefore be assumed that such an alarm is indicated while it is outstanding. However, since the signal S11 is additionally the first alarm signal that is generated in the context of the exemplary embodiment described here, even an (incorrect) marking as a secondary alarm would have been harmless in the context of the present invention, since an alarm which occurs first is always indicated and is preferably never suppressed as a secondary alarm.

Further alarms occur at subsequent time points t3 and t4, as illustrated by the signal profiles S12 or S14, but are nonetheless dependent in their occurrence on the first alarm (signal profile S11). For example, the signal S11 is an error signal which indicates the failure of a network card. Accordingly, the signal profiles S12 and S14 can be e.g. error signals which indicate the lack of an expected pressure or temperature measurement signal, wherein the absence of the measurement signals is causally linked to the faulty operation of the network card. The alarms belonging to the signal profiles S12 and S14 are accordingly identified as secondary alarms by means of a corresponding entry in the secondary-alarm/configuration matrix and, as part of embodiments of the present invention, are suppressed from the time point t3 until the time point t6 or from the time point t4 until the time point t7 respectively, this being shown in FIG. 5 by means of the thick horizontal bars (cf. signal profiles S13 and S15). In other words: for at least as long as the independent alarm belonging to the signal profile S11 is outstanding, those alarms which are identified as secondary alarms are suppressed.

If the cause of the generation of the signal S11 is cleared at the time point t6, the still outstanding secondary alarm as per signal profile S12 is initially indicated—as shown by the signal profile S13. In this case, this is because the signal profile S12 at the time point t3 was generated before the secondary alarm belonging to the signal profile S14 (generation time point t4). If then the first secondary alarm (signal profile S12) is likewise no longer outstanding at the time point t7, the second secondary alarm (signal profile S14) is then indicated between the time points t7 and t8.

However, it also routinely occurs that when the cause of the independent error signal (signal profile S11) ceases, the cause of the secondary alarms is also removed, such that no more alarms are indicated after the time point t6.

Figure 6:
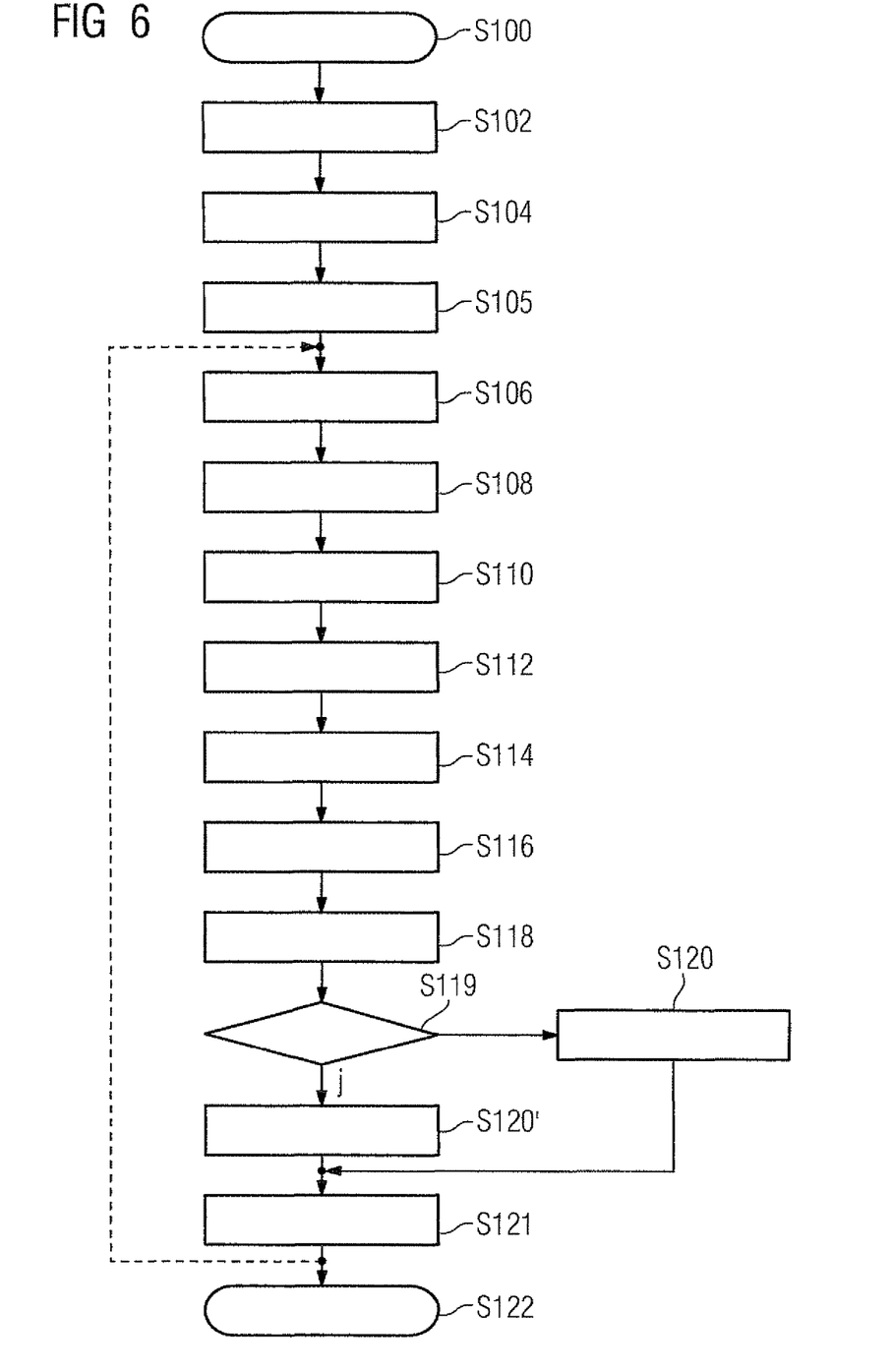

FIG. 6 shows a flow diagram for illustrating an embodiment of the method according to the invention for operating a process plant, in particular the process plant 1 in FIG. 1.

The method starts in the step S100. In a subsequent step S102, a number of process states of the process plant are defined. In particular, a number of sub-processes can be defined at process level in step S102 in this case, wherein each sub-process is assigned a number of sub-process states and a number of generatable alarm notifications in the form of an alarm group.

In step S104, each (sub-)process state is then correlated with the totality of the generatable alarm notifications, i.e. all of the alarm notifications that can be generated in connection with the relevant (sub-)process, wherein each pair that is formed from a process state and an alarm notification is assigned a first value or a second value as a correlation value. According to the invention, in this case the correlation in step S104 preferably takes place in the form of at least one secondary-alarm/configuration matrix, as already illustrated in detail above.

In the step S105, each generatable alarm notification of a relevant (sub-)processes is then assigned a dependency value, i.e. the relevant alarm is either identified as a secondary alarm or not.

For the purpose of the following description, it is assumed that the alarm-hiding mechanism which is proposed in the context of the present invention is activated (S1=1 in FIG. 4).

In step S106, a current process state or sub-process state of the process plant is determined.

The determined state is transferred to the alarm processing system at process control level (step S108) by means of a corresponding state component. Practically at the same time, in the step S110 an error signal (cf. FIG. 3) is also transferred to the alarm processing system. In the event of a non-compliant process state, in step S112 the alarm emitters of at least one alarm group (FIG. 2) generate corresponding alarms or alarm notifications, which are likewise transferred to the alarm processing system by means of an assigned reporting component (FIG. 1) in step S114. In step S116, in accordance with the transferred error signal, said alarm processing system determines whether the proposed alarm-hiding mechanism is applied using the secondary-alarm/configuration matrices.

It is assumed that this is the case here; in the next step S118, a masking of specific alarm notifications consequently takes place on the basis of the correlation values contained in the matrices, wherein only alarm notifications that have not been masked can be indicated by the alarm indication entity. In step S119, a check is finally carried out to establish whether the non-masked alarm notifications are secondary alarms. If this is the case (n), in step S120 those alarm notifications that are neither masked nor classified as secondary alarms are indicated. Practically at the same time, in step S121 all generated alarm notifications are archived in the storage entity of the process plant.

In the event of a positive response to the query in step S119 (y), the method branches to step S120' in which only non-masked alarm notifications which are also not identified as secondary alarms are indicated. Practically at the same time, in step S121 all generated alarm notifications are preferably again archived in the storage entity of the process plant.

The method terminates in step S122. Alternatively and in a manner which is relevant in practice, however, the method can return to step S106 after step S120, this being indicated in FIG. 5 by means of a broken line. The current process state of the process plant is then determined again accordingly in step S106, whereupon the method is repeated staring at step S108.

Alternatively, it is also possible to start again at step S102, S104 or S105 if the process plant or parts thereof are reconfigured.

In this way, the invention allows sub-process states to be recognized for the purpose of assessing the relevance of alarms in combination with or based on the correlation between part-plant state and the totality of all part-plant alarms, this correlation being advantageously configured in the form of a matrix. In this way, simple planning of the alarm relevance is possible in relation to the process plant according to the invention, without system and programming knowledge.

Moreover, by providing dependency values for the individual generatable alarm notifications, it is also possible to prevent the occurrence of barely manageable report floods by classifying specific alarms as secondary alarms, without adversely affecting the plant safety thereby. The classification of specific alarms as secondary alarms can also be advantageously configured in the form of a matrix, in particular in the form of a special embodiment of the above cited correlation matrix as a secondary-alarm/configuration matrix. The simple planning possibility which is also cited above is thus retained.

In conclusion, despite the fact that an exemplary embodiment of the present invention was described above in which both a relevance-based masking of alarms and a dependency-based masking of alarms was realized, it is emphasized that the present invention is in no way restricted to embodiments in which both types of alarm suppression are implemented together.

The present invention encompasses—as detailed in the appended set of claims—in particular those embodiments in which only dependency-based alarm suppression (secondary-alarm suppression) is implemented.

The invention claimed is:

1. A method for operating a process plant, comprising:
defining a plurality of process states of the process plant;
defining alarm notifications generated during an operation of the process plant, wherein a plurality of alarm notifications for indicating non-compliant operating events of the process plant are generated at a process level;
assigning a first value or a second value to a plurality of the generated alarm notifications in each case as a dependency value;
correlating each process state with a totality of the generated alarm notifications to receive a plurality of pairs, each pair including a process state and an alarm notification;
assigning each pair of a process state and an alarm notification a first value or a second value as a correlation value; and
determining a current process state of the process plant, wherein
depending on a determined process state, those alarm notifications to which the first value is assigned as a dependency value or to which the first value is assigned as a correlation value, are not indicated.

2. The method as claimed in claim 1, wherein the dependency values are arranged in a secondary-alarm matrix, wherein one dimension of the secondary-alarm matrix is formed by the generated alarm notifications.

3. The method as claimed in claim 2, wherein a correlation of process states and alarm notifications is based upon a configuration matrix, wherein a first dimension of the configuration matrix is formed by the defined plurality of process states of the process plant and a second dimension of the configuration matrix is formed by the generated alarm notifications, wherein a correlation values represent entries in the configuration matrix.

4. The method as claimed in claim 3, wherein the secondary-alarm matrix is a part of the configuration matrix.

5. The method as claimed in claim 1, wherein an individual secondary-alarm matrix is assigned to each defined process state.

6. The method as claimed in claim 1, wherein following cessation of alarm notifications to which the second value has been assigned as a dependency value, remaining outstanding alarm notifications to which the first value has been assigned as a dependency value, are indicated.

7. The method as claimed in claim 6, wherein the remaining outstanding alarm notifications are indicated sequentially in sequence of their generation.

8. The method as claimed in claim 6, wherein each generated alarm notification is assigned a priority value in addition to or together with the dependency value, and wherein the remaining outstanding alarm notifications are indicated sequentially depending on their priority value.

9. The method as claimed in claim 1, wherein an alarm notification which is generated first relative to time depending on the determined process state is also indicated if it is assigned the first value as a correlation value.

10. The method as claimed in claim 1, wherein the second value is assigned as a dependency value by default.

11. The method as claimed in claim 1, wherein depending on the determined process state, at least those alarm notifications, to which the first value is assigned as a correlation value are archived in a storage entity.

12. The method as claimed in claim 11, wherein all generated alarm notifications are archived in the storage entity.

13. The method as claimed in claim 1, wherein the determined current process state of the process plant is determined at process level and is transferred together with the totality of the generated alarm notifications to a process control level of the process plant, wherein assigning of the first value or the second value to the plurality of the generated alarm notifications in each case as a dependency value is performed in an alarm processing system at the process control level, and wherein a non-indication of the alarm notifications to which the first value has been assigned as a dependency value is performed in an alarm processing system at the process control level.

14. The method as claimed in claim 1, wherein, when the process plant changes to a new process state, a non-indication of alarm notifications to which the first value has been assigned as a correlation value or to which the first value has been assigned as a dependency value, wherein the alarm notifications depend on the determined process state, is executed again at a time point of the change of the process state, wherein outstanding generated alarm notifications are indicated depending on the new process state.

15. The method as claimed in claim 1, wherein, when the process state is incorrectly determined, all further generated alarm notifications are also indicated regardless of their value.

16. The method as claimed in claim 1, wherein a plurality of sub-processes are defined at a process level, wherein each sub-process is assigned a number of sub-process states and a number of generated alarm notifications based on an alarm group, and wherein assigning of the first value or the second value to the plurality of the generated alarm notifications in each case as a dependency value and a determination of non-indication of alarm notifications is executed separately for each sub-process.

17. A process plant, comprising:
   a plurality of alarm emitters at process level, wherein the plurality of alarm emitters generate a number of alarm notifications for indicating non-compliant operating events of the process plant;
   an alarm indication device for indicating alarm notifications; and
   an alarm processing system at a process control level to receive generated alarm notifications,
   wherein a plurality of alarm notifications are assigned to a first value or a second value in each case as a dependency value,
   wherein each process state of the process plant is correlated with a totality of the generated alarm notifications to receive a plurality of pairs, each pair including a process state and an alarm notification,
   wherein each pair of a process state and an alarm notification is assigned a first value or a second value as a correlation value, and
   wherein the alarm processing system controls the alarm indication device based on the dependency value or the correlation value such that those alarm notifications which were assigned the first value as a dependency value or the correlation value are masked.

18. The process plant as claimed in claim 17, wherein the alarm processing system for the alarm notifications has at least one secondary-alarm matrix, wherein one dimension of the secondary-alarm matrix is formed by the generated alarm notifications, wherein the dependency values represent entries in the secondary-alarm matrix.

19. The process plant as claimed in claim 17, wherein a sub-group of the alarm emitters is assigned at least one state component which determines at least one current process state of the process plant from a number of defined process states, and wherein the alarm processing system receives a state signal which represents the determined process state and correlates each defined process state with a totality of the received alarm notifications, wherein each pair of a process state and an alarm notification is assigned a first value or a second value as a correlation value, wherein the alarm processing system controls an alarm indication entity depending on the state signal such that those alarm notifications to which the first value has been assigned as a correlation value or to which the first value has been assigned as a dependency value are masked.

* * * * *